(12) United States Patent
Vayda

(10) Patent No.: US 9,499,755 B2
(45) Date of Patent: Nov. 22, 2016

(54) COMPOSITE BRIQUETTE FOR STEELMAKING OR IRONMAKING FURNACE CHARGE

(71) Applicant: Pierre Vayda, Burlington (CA)

(72) Inventor: Pierre Vayda, Burlington (CA)

(\*) Notice: Subject to any disclaimer, the term of this patent is extended or adjusted under 35 U.S.C. 154(b) by 0 days.

(21) Appl. No.: 14/472,579

(22) Filed: Aug. 29, 2014

(65) Prior Publication Data

US 2015/0344799 A1 Dec. 3, 2015

Related U.S. Application Data

(63) Continuation-in-part of application No. 14/289,960, filed on May 29, 2014.

(51) Int. Cl.
| | | |
|---|---|---|
| *C22B 1/245* | (2006.01) | |
| *C21B 13/00* | (2006.01) | |
| *C01F 5/24* | (2006.01) | |
| *C10L 5/04* | (2006.01) | |
| *C21C 5/52* | (2006.01) | |
| *C21B 5/00* | (2006.01) | |
| *C21C 5/28* | (2006.01) | |
| *C21C 7/00* | (2006.01) | |
| *C21C 5/36* | (2006.01) | |

(52) U.S. Cl.
CPC .. *C10L 5/04* (2013.01); *C01F 5/24* (2013.01); *C21B 5/00* (2013.01); *C21B 13/008* (2013.01); *C21C 5/28* (2013.01); *C21C 5/52* (2013.01); *C21C 7/0087* (2013.01); *C22B 1/245* (2013.01); *C21C 2005/366* (2013.01); *Y02P 10/216* (2015.11)

(58) Field of Classification Search
CPC ........ C22B 1/245; C21B 13/008; C01F 5/24
See application file for complete search history.

(56) References Cited

U.S. PATENT DOCUMENTS

| | | | | |
|---|---|---|---|---|
| 3,923,526 A | \* | 12/1975 | Takashima | B22D 7/10 106/38.22 |
| 4,061,501 A | \* | 12/1977 | Ivarsson | C04B 28/24 501/118 |
| 6,375,711 B1 | \* | 4/2002 | McCann | C21C 5/54 65/20 |

FOREIGN PATENT DOCUMENTS

| | | | | |
|---|---|---|---|---|
| AU | 47421 | \* | 4/1974 | |
| GB | 1427872 A | \* | 3/1976 | ............. C04B 35/66 |

\* cited by examiner

*Primary Examiner* — George Wyszomierski
*Assistant Examiner* — Tima M McGuthry Banks
(74) *Attorney, Agent, or Firm* — Renner Kenner Greive Bobak Taylor & Weber

(57) ABSTRACT

A briquette for addition to the charge in a steelmaking or ironmaking furnace includes at least 15% by weight of magnesium carbonate, and a binder.

14 Claims, No Drawings

COMPOSITE BRIQUETTE FOR STEELMAKING OR IRONMAKING FURNACE CHARGE

CROSS-REFERENCE TO RELATED APPLICATION

This application is a continuation-in-part of U.S. patent application Ser. No. 14/289,960 filed on May 29, 2014, the content of which is incorporated herein by reference in its entirety.

FIELD OF THE INVENTION

The present invention relates generally to ferrous metallurgy and in particular, to a composite briquette for a steelmaking or ironmaking furnace charge.

BACKGROUND OF THE INVENTION

In the field of steelmaking, an electric furnace charge is typically made from scrap metal, carbon and fluxes such as lime and/or dolime, all in pieces having a minimum size of 0.5 inch (about 12.7 mm).

It is known to add specific materials to a furnace charge in the form of briquettes. However, carbon, which is an essential part of the mixture of materials, is quite slippery in its powdered or comminuted form. Consequently, carbon is typically employed in a non-pulverized state, for example as metallurgical coke. It would be of advantage to be able to utilize carbon "fines", for example those recovered from a dust collector, and to recycle such fines in their powdered or dust state. A further problem relates to the density of carbon, which is quite low compared generally to the metals. For example, when carbon is added to the furnace via a charge bucket, it will tend to float on top of the liquid metal, thus decreasing the yield of carbon in solution in the steel.

It would also be of advantage to improve the quality of the slag through the addition of a briquette.

It is an object at least to provide a novel composite briquette for a steelmaking or ironmaking furnace charge.

SUMMARY OF THE INVENTION

In one aspect, there is provided a composite briquette for addition to the charge in a steelmaking or ironmaking furnace, the briquette comprising: at least 15% by weight of magnesium carbonate; and a binder.

The briquette may comprise about 90% by weight magnesium carbonate and about 10% by weight of the binder.

The briquette may further comprise one or more substances selected from the group consisting of limestone ($CaCO_3$), dolomite ($CaMg(CO_3)_2$), dolime ($CaO.MgO$), burnt lime ($CaO$), hydrated lime ($Ca(OH)_2$), and magnesium oxide ($MgO$).

The briquette may further comprise one or more carbonaceous substances selected from the group consisting of: metallurgical coke, carbon fines, anthracite, and non-anthracitic coal. The briquette may comprise from 5 to 50% by weight of the carbonaceous substances. The briquette may comprise about 75% by weight magnesium carbonate, about 15% by weight metallurgical coke, and about 10% by weight of the binder. The briquette may further comprise from 1 to 15% by weight of magnesium oxide. The briquette may comprise about 52% by weight magnesium carbonate, about 30% by weight metallurgical coke, about 9% by weight magnesium oxide, and about 9% by weight of the binder.

The magnesium carbonate may be powdered magnesium carbonate ore, and wherein briquette, after calcining, may further comprise one or more substances selected from the group consisting of: $CaO$, $Al_2O_3$, $SiO_2$, and $Fe_2O_3$.

The briquette may comprise from 1 to 20% by weight of the binder. The binder may comprise molasses and hydrated lime. The binder may comprise dextrin combined with water.

The furnace may be an electric arc furnace, a basic oxygen furnace, or a blast furnace.

In one embodiment, there is provided the use of the briquette as addition to the charge in the steelmaking or ironmaking furnace, the furnace being an electric arc furnace, a basic oxygen furnace, or a blast furnace.

In another aspect, there is provided a method of improving the slag-covered charge in a steelmaking or ironmaking furnace, the method comprising: introducing a quantity of magnesium carbonate to the charge below the slag in the steelmaking or ironmaking furnace, whereby upon introducing the quantity of magnesium carbonate to the charge, $CO_2$ is generated, such that the $CO_2$ foams the slag from underneath.

The quantity of magnesium carbonate may be in the form of a loose powder. The loose powder may be magnesium carbonate ore, and the loose powder, after calcining, may further comprise one or more substances selected from the group consisting of: $CaO$, $Al_2O_3$, $SiO_2$, and $Fe_2O_3$.

The quantity of magnesium carbonate may be combined with a binder, and the method may further comprise: prior to said introducing, compressing said quantity of magnesium carbonate and said binder in a suitable mold to make a briquette, whereby said introducing comprises introducing said briquette to the charge below the slag in the steelmaking or ironmaking furnace. The briquette may comprise about 90% by weight magnesium carbonate and about 10% by weight of the binder. The briquette may further comprise one or more carbonaceous substances selected from the group consisting of: metallurgical coke, carbon fines, anthracite, and non-anthracitic coal. The briquette may comprise from 5 to 50% by weight of the carbonaceous substances. The briquette may comprise about 75% by weight magnesium carbonate, about 15% by weight metallurgical coke, and about 10% by weight of the binder. The briquette may further comprise from 1 to 15% by weight of magnesium oxide. The briquette may comprise about 52% by weight magnesium carbonate, about 30% by weight metallurgical coke, about 9% by weight magnesium oxide, and about 9% by weight of the binder. The magnesium carbonate may be powdered magnesium carbonate ore, and the briquette, after calcining, may further comprise one or more substances selected from the group consisting of: $CaO$, $Al_2O_3$, $SiO_2$, and $Fe_2O_3$. The briquette may further comprise from 1 to 20% by weight of the binder. The binder may comprise molasses and hydrated lime. The binder may comprise dextrin combined with water.

The furnace may be an electric arc furnace, a basic oxygen furnace, or a blast furnace.

In another aspect, there is provided a composite briquette for addition to the charge in a steelmaking or ironmaking furnace, the briquette comprising: a quantity of carbon fines; a material in powdered form, the material selected from the group consisting of iron powder and iron oxide, the material densifying the briquette and suppressing the slippery nature of the carbon fines; a quantity of magnesium carbonate; and a binder.

The briquette may further comprise one or more selected from the group consisting of: limestone, burnt lime, hydrated lime, dolomite, and dolime.

50% of the total briquette weight may be carbon fines, 25% of the total briquette weight may be iron powder, and the remainder of the total briquette weight, apart from the binder, may be magnesium carbonate and one or more selected from the group consisting of: limestone, burnt lime, hydrated lime, dolomite, and dolime.

The briquette may comprise from 1 to 20% by weight of the binder.

The binder may comprise molasses and hydrated lime. The binder may comprise dextrin combined with water.

The furnace may be an electric arc furnace, a basic oxygen furnace, or a blast furnace.

In one embodiment, there is provided the use of the briquette as addition to the charge in the steelmaking or ironmaking furnace, the furnace being an electric arc furnace, a basic oxygen furnace, or a blast furnace.

In another aspect, there is provided a method of improving the slag-covered charge in a steelmaking or ironmaking furnace, the method comprising: making a mixture of: a quantity of carbon fines, a material in powdered form selected from the group consisting of iron powder and iron oxide, the material densifying the briquette and suppressing the slippery nature of the carbon fines, a quantity of magnesium carbonate, and a binder; compressing a portion of said mixture in a suitable mold to make a briquette; and introducing said briquette to the charge below the slag in the steelmaking or ironmaking furnace so that said material in powdered form contained in the briquette will cause the same to sink into the charge.

The mixture may further comprise one or more selected from the group consisting of: limestone, burnt lime, hydrated lime, dolomite, and dolime.

50% of the total briquette weight may be carbon fines, 25% of the total briquette weight may be iron powder, and the remainder of the total briquette weight, apart from the binder, may be magnesium carbonate and one or more selected from the group consisting of: limestone, burnt lime, hydrated lime, dolomite, and dolime.

The material may be iron powder, whereby upon introducing the briquette to the charge, $CO_2$ is generated such that the $CO_2$ foams the slag from underneath.

The material may be iron oxide, whereby upon introducing the briquette to the charge, caloric heat is added thereto while iron and $CO_2$ are generated, such that the $CO_2$ foams the slag from underneath.

The mixture may comprise from 1 to 20% by weight of the binder.

The binder may comprise molasses and hydrated lime. The binder may comprise dextrin combined with water.

The furnace may be an electric arc furnace, a basic oxygen furnace, or a blast furnace.

DETAILED DESCRIPTION OF ILLUSTRATIVE EMBODIMENTS

The following is directed to a composite briquette for addition to the charge in a steelmaking or ironmaking furnace, and which comprises magnesium carbonate ($MgCO_3$).

Magnesium carbonate is known to thermally decompose at a lower temperature than dolomite ($CaMg(CO_3)_2$) and limestone ($CaCO_3$). Specifically, $MgCO_3$ thermally decomposes into magnesium oxide (MgO) and carbon dioxide ($CO_2$) at about 402° C., while $CaMg(CO_3)_2$ and $CaCO_3$ each thermally decompose into their constituent oxides at about 730° C. and about 825° C., respectively. As a result, when added to the charge in a steelmaking or ironmaking furnace, magnesium carbonate thermally decomposes more quickly, and more readily, than limestone or dolomite.

Table 1 shows a non-limiting example of a mixture from which a briquette can be fashioned:

TABLE 1

| Carbon | C | 50% |
|---|---|---|
| Powdered iron | Fe | 25% |
| Magnesium carbonate | $MgCO_3$ | 25% |
| Total | | 100% |

In the table above, deviations from the indicated percentages are permissible. In this embodiment, the carbon is in the form of loose carbon fines recovered from a dust collector, such as a dust collector of an electric arc furnace, and the magnesium carbonate is in the form of powdered magnesium carbonate ore. The mixture may be combined with a suitable binder, such as for example industrial molasses and powdered hydrated lime ($Ca(OH)_2$), and the binder may make up 1 to 20%, or more, of the total weight of the briquette.

The example illustrated in Table 1 specifies powdered iron. However, this teaching is not intended to be restrictive, as it is possible to use one or more of iron, iron oxide, chromium, chromium oxide, nickel, and nickel oxide to achieve the same effect. If iron oxide is used, the reaction products will be iron and $CO_2$ gas, as well as caloric heat that results from burning of the iron oxide. The iron will revert to the bath, thus increasing its yield.

The magnesium carbonate could be combined with limestone and/or dolomite, each of which will produce $CO_2$ gas. Dolime (CaO.MgO), burnt lime (CaO), hydrated lime ($Ca(OH)_2$), and/or magnesium oxide (MgO) may also be included.

The ironmaking furnace may be, for example, a blast furnace. The steelmaking furnace may be, for example, an electric arc furnace, a basic oxygen furnace, and the like. Preferably, the furnace is a blast furnace or an electric arc furnace.

In use, the briquette is added to the charge in a steelmaking or ironmaking furnace, in such a manner that it is immersed within the charge. The briquette dissolves and reacts with the contents of the charge. The powdered iron reverts to the bath, thus increasing its yield. The magnesium carbonate thermally decomposes into magnesium oxide (MgO) and carbon dioxide ($CO_2$). The MgO produced is absorbed by the slag. The $CO_2$ produced has the effect of foaming the slag from underneath, as the location where the $CO_2$ is generated is buried within the charge.

As will be appreciated, the low decomposition temperature of magnesium carbonate advantageously allows the slag thickness to be increased more rapidly than, and with less energy consumption than, other substances such as limestone, dolomite, and the like. As will be understood, the rapid formation of a thick slag decreases the amount of oxidation of iron in the bath, which improves the reaction yield. Additionally, if the steelmaking furnace is an electric arc furnace, the increased thickness of the slag advantageously causes the arc to be more localized within the bath and under the slag, which improves efficiency of the electric arc furnace and thereby allows melt times to be shortened. These performance characteristics help mitigate the environmental impact of steelmaking and ironmaking operations, and conserve resources.

As will be appreciated, the accompanying production of $CO_2$ gas that occurs upon decomposition of magnesium carbonate causes bubbling under the surface of the bath, which advantageously causes mixing and improves the quality of the slag, and namely the foaminess, consistency and stability of the slag.

As will be appreciated, the addition of MgO to the slag advantageously results in formation of a protective layer of MgO on the walls of the furnace. As will be understood, as the melt is being drained from the furnace, the slag contacts the wall surfaces of the furnace and deposits a layer of MgO thereon. As a result, a new protective refractory coating is automatically deposited on the walls of the furnace with each use, which eliminates the need for separate application of a protective wall coating that would otherwise form part of routine furnace maintenance.

Preferably, the briquette comprises from 20 to 80% by weight of the carbon fines. More preferably, the briquette comprises 30 to 70% by weight of the binder, more preferably 40 to 60%, most preferably about 45%.

Although in the embodiment described above, the carbon is in the form of carbon fines, in other embodiments, the carbon may alternatively be in the form of one or more other carbonaceous substances, such as for example such as metallurgical coke, anthracite, non-anthracitic coal, and the like.

The briquette is not limited to the composition described above, and in other embodiments, the briquette may alternatively have other compositions. For example, in another embodiment, magnesium carbonate may be added to the charge of a steelmaking or ironmaking furnace to improve the quality of the slag.

For example, powdered magnesium carbonate ore may be combined with a suitable binder, such as for example industrial molasses and powdered hydrated lime, and compressed in a suitable mold to make a briquette. The binder may make up 1 to 20%, or more, of the total weight of the briquette.

The amount of magnesium carbonate in the briquette may be selected according to the particular characteristics of the furnace and to the particular steel grade. Preferably, the briquette comprises at least 15% by weight of magnesium carbonate. More preferably, the briquette comprises 50 to 95% by weight of magnesium carbonate, still more preferably 70 to 95%, and most preferably 90%.

The magnesium carbonate could be combined with one or more other substances, if adjustment of slag functionalities (e.g. alumina gettering, desulphurization, etc.) is desired. Such substances may comprise, for example, limestone and/or dolomite, each of which will produce $CO_2$ gas upon decomposition, and/or any of dolime, burnt lime, hydrated lime, and magnesium oxide. Still other substances may be combined with the magnesium carbonate. As will be understood, an advantage of using a binder comprising hydrated lime is the efficient and controlled addition of CaO to the slag for predictable adjustment of slag functionalities.

The ironmaking furnace may be, for example, a blast furnace. The steelmaking furnace may be, for example, an electric arc furnace, a basic oxygen furnace, and the like. Preferably, the furnace is a blast furnace or an electric arc furnace.

In use, the briquette is added to the charge in a steelmaking or ironmaking furnace, in such a manner that it is immersed within the charge. The briquette dissolves and reacts with the contents of the charge. The magnesium carbonate thermally decomposes into magnesium oxide (MgO) and carbon dioxide ($CO_2$). The MgO produced is absorbed by the slag. The $CO_2$ produced has the effect of foaming the slag from underneath, as the location where the $CO_2$ is generated is buried within the charge.

In another embodiment, magnesium carbonate ore, in absence of a binder, may be added in powdered or granular form to the charge of a steelmaking or ironmaking furnace for improving the quality of the slag.

In still another embodiment, the briquette may alternatively comprise a mixture of magnesium carbonate and one or more carbonaceous substances, such as metallurgical coke, carbon fines, anthracite, non-anthracitic coal, and the like. For example, powdered magnesium carbonate ore and powdered metallurgical coke may be combined with a suitable binder, such as for example industrial molasses and powdered hydrated lime, and compressed in a suitable mold to make a briquette. The binder may make up 1 to 20%, or more, of the total weight of the briquette.

The amount of magnesium carbonate in the briquette may be selected according to the particular characteristics of the furnace and to the particular steel grade. Preferably, the briquette comprises at least 15% by weight of magnesium carbonate. Preferably, the briquette comprises 30 to 90% by weight of magnesium carbonate, more preferably 40 to 90%, most preferably about 50 to about 75%.

Preferably, the briquette comprises from 5 to 50% by weight of the one or more carbonaceous substances. More preferably, the briquette comprises 10 to 40% by weight of the binder, more still preferably 10 to 35%, most preferably either about 14% or about 30%.

One or more other substances could be combined with the powdered magnesium carbonate ore and powdered metallurgical coke, if adjustment of slag functionalities (e.g. alumina gettering, desulphurization, etc.) is desired. Such substances may comprise, for example, limestone and/or dolomite, each of which will produce $CO_2$ gas upon decomposition, and/or any of dolime, burnt lime, hydrated lime, and magnesium oxide. Still other substances may be combined with the magnesium carbonate and powdered metallurgical coke.

The ironmaking furnace may be, for example, a blast furnace. The steelmaking furnace may be, for example, an electric arc furnace, a basic oxygen furnace, and the like. Preferably, the furnace is a blast furnace or an electric arc furnace.

In use, the briquette is added to the charge in a steelmaking or ironmaking furnace, in such a manner that it is immersed within the charge. The briquette dissolves and reacts with the contents of the charge. The magnesium carbonate thermally decomposes into magnesium oxide (MgO) and carbon dioxide ($CO_2$). The MgO produced is absorbed by the slag. The $CO_2$ produced has the effect of foaming the slag from underneath, as the location where the $CO_2$ is generated is buried within the charge.

As will be appreciated, the combination of a carbonaceous substance with one or more denser compounds, such as magnesium carbonate, in briquette form advantageously enables carbon to be introduced into the bath in a more facile manner, as compared to adding loose carbonaceous powder, and thereby increases the carbon addition efficiency. This higher carbon addition efficiency advantageously allows the final carbon composition in the bath and in the slag to be more accurately predicted.

Although in the embodiments described above, the binder comprises industrial molasses and hydrated lime, in other embodiments, the binder may alternatively comprise dextrin and water, which may for example be combined in a 7:3 weight ratio. Still other suitable binders may alternatively be used.

In the embodiments described above, the briquette may comprise from 1 to 20% or more, by weight, of the binder. Preferably, the briquette comprises from 1 to 15% by weight of the binder. More preferably, the briquette comprises 5 to 15% by weight of the binder, more preferably 7 to 12%, most preferably 10%.

Although in the embodiments described above, the powdered magnesium carbonate is in the form of powdered magnesium carbonate ore, in other embodiments, other suitable sources of magnesium carbonate may alternatively be used.

The briquette of the embodiments described above may be made from powders having particle sizes within any suitable range.

The following examples illustrate various applications of the above-described embodiments.

Example 1

In this example, a briquette having the composition shown in Table 2 was made:

TABLE 2

| Carbon fines | 43.6% |
|---|---|
| Fe | 22.1% |
| Dolomite | 24.3% |
| Molasses | 6.0% |
| Lime (hyd.) | 4.0% |

The briquette was formed by providing a mixture of loose carbon fines (particle size range of about 0.8 to about 1.0 mm) recovered from a dust collector of an electric arc furnace, powdered iron (particle size range of about 0.4 to about 0.6 mm), and a powdered dolomite ore (particle size range of about 0.8 to about 4.8 mm), together with a binder consisting of a mixture of industrial molasses and powdered hydrated lime.

As will be understood, the powdered iron could be replaced with powdered iron oxide ($Fe_2O_3$), which will produce $CO_2$ gas and contribute to the foaming effect described above.

The briquette had the post-calcination composition shown in Table 3:

TABLE 3

| C | 43.7% |
|---|---|
| Fe | 22.5% |
| CaO | 12.2% |
| MgO | 6.6% |
| S | 2.9% |
| L.O.I. | 12.1% |

The L.O.I. is mainly attributed to the decomposition of the dolomite and the binder used. The layer of CO and $CO_2$ produced will protect the bath from oxidation and enhance the carbon yield.

The manufacturing process by which the briquette is formed has the effect of densification, with the following typical values: loose carbon prior to compression has a density of approximately 0.63 to 0.65 g/cm³. If a briquette is manufactured from the loose carbon only, the density can be raised into the range of 1.6 to 1.75 g/cm³. However, utilizing the formulation given at the beginning of this example, and compressing the formulation, will yield a density in the range of 2.4 to 2.6 g/cm³.

The densification due to compression has the effect of increasing the efficiency of the carbon addition, since the carbon is allowed to penetrate the bath, rather than simply floating on top of the bath.

Example 2

In this example, a briquette having the post-calcination composition shown in Table 4 was made:

TABLE 4

| MgO | 92.19% |
|---|---|
| CaO | 2.46% |
| $Al_2O_3$ | 0.85% |
| $SiO_2$ | 2.58% |
| $TiO_2$ | 0.14% |
| $Fe_2O_3$ | 0.71% |
| $Cr_2O_3$ | 0.02% |
| MnO | 0.05% |
| S | <0.001% |
| Moisture | 1.0% |
| Total | 100% |

The briquette was formed by providing a mixture of powdered magnesium carbonate ore (particle size range of about 0.8 to about 4.8 mm) and a binder, combined in a weight ratio of 90:10, and compressing the mixture in a suitable mold. The binder was a mixture of industrial molasses and powdered hydrated lime, combined in a weight ratio of 3:2.

The briquette had a generally square shape and a size of about 40 mm per side, with a density of 2.18 g/cm³ and a white colour. The briquette had a L.O.I. value of 35.0%, which is mainly attributed to the decomposition of the magnesium carbonate and the binder. Notably, the L.O.I. value of the briquette is lower than the L.O.I. value of the loose powder of Example 3.

The briquette was used during reactions in a 125 tonne electric arc furnace. A summary of the performance of the briquette ("Briquette A") during the reactions is shown in Table 5. For comparison, a summary of the performance of a standard conventional additive, namely crushed brick ("standard practice"), during the reactions is also shown:

TABLE 5

|  | Standard Practice | Briquette A | difference |
|---|---|---|---|
| Number of Heats | 44 | 11 |  |
| Quantity added (lbs) | 3500 | 3500 |  |
| Actual MgO added (lbs) | 3220 | 2100 | −34.78% |
| Average MgO in solution (%) | 8.79 ± 1.75 | 9.20 ± 1.88 | +4.66% |
| Briquette A with $1^{st}$ charge (%) |  | 10.69 ± 1.80 |  |
| Briquette A with $2^{nd}$ charge (%) |  | 7.95 ± 0.62 |  |

As may be seen, the use of Briquette A results in a reduction of the actual MgO added by about 35%, while advantageously increasing the average MgO in the slag by about 4.5%. The amount of MgO in the slag is about 34% higher when the Briquette A was added with the first charge (i.e. when little or no slag layer previously existed) than when the Briquette A was added with the second charge.

The decomposition of magnesium carbonate within Briquette A produces fine, active MgO particles, which are absorbed by the slag. It was observed that when Briquettes A were added and the briquettes penetrated the slag so as to be buried in the charge, tiny bubbles of $CO_2$ were seen to form.

The average composition of the slag after the reactions, by weight percent, is shown in Table 6:

TABLE 6

|  | Standard Practice | Briquette A | difference |
|---|---|---|---|
| CaO | 36.07 ± 3.72 | 36.41 ± 3.04 | +0.93% |
| $Al_2O_3$ | 6.99 ± 1.98 | 7.68 ± 0.99 | +9.87% |
| $SiO_2$ | 11.83 ± 3.75 | 13.23 ± 1.44 | +11.83% |
| $Fe_2O_3$ | 27.71 ± 7.32 | 24.59 ± 5.53 | −11.26% |
| $Mn_2O_3$ | 5.46 ± 1.03 | 5.31 ± 0.37 | −2.82% |

As may be seen, the use of Briquette A results in a reduction of the iron content of the slag by more than 11%, as compared to standard practice. This may be attributed to the ability of the magnesium carbonate to rapidly decompose and contribute to or form the slag, which allows a protective barrier to more quickly form on the bath surface. As a result, less of the iron in the bath is oxidized during the reaction, which advantageously increases the yield of the reaction.

During the test, 22 heats were carried out using crushed brick, followed by 11 heats carried out using Briquette A, followed by 22 heats carried out using crushed brick. The operational performance of the 125 tonne electric arc furnace before, during, and after the addition of Briquette A is shown in Table 7:

TABLE 7

|  | Standard Practice (before test) | Standard Practice (after test) | Standard Practice (avg) | Briquette A |
|---|---|---|---|---|
| Power usage (KWh/T) | 427.0 ± 24.1 | 428.0 ± 14.4 | 427.5 | 420.0 ± 9.9 |

As may be seen, the amount of power required for the reaction is lower when Briquette A is used, as compared to standard practice.

Example 3

Magnesium carbonate may alternatively be added to the charge in the form of a loose powder. A loose, powdered magnesium carbonate ore (particle size range of about 0.8 to about 4.8 mm) having the post-calcination composition shown in Table 8 was used:

TABLE 8

| MgO | 97.0% |
|---|---|
| CaO | 2.0% |
| $Al_2O_3$ | 0.2% |
| $SiO_2$ | 0.3% |
| $Fe_2O_3$ | 0.5% |
| Total | 100% |

The loose powder had a density of 2.28 g/cm³ and a white colour.

The loose powder was used during a reaction in a 125 tonne electric arc furnace.

The loose powder had a L.O.I. value of 51.1%. Notably, the L.O.I. value of the loose powder is greater than the L.O.I. value of the briquette of Example 2.

Example 4

In this example, a briquette having the composition shown in Table 9 was made:

TABLE 9

| Metallurgical coke | 30.3% |
|---|---|
| MgO | 9.1% |
| $MgCO_3$ | 51.6% |
| Molasses | 5.4% |
| Lime (hyd.) | 3.6% |

The briquette was formed by providing a mixture of powdered metallurgical coke (particle size range of about 0.8 to about 1.0 mm), powdered magnesium oxide (particle size range of about 0.4 to about 0.6 mm), and powdered magnesium carbonate ore (particle size range of about 0.8 to about 4.8 mm), together with a binder consisting of a mixture of industrial molasses and powdered hydrated lime.

The briquette had a generally square shape and a size of about 54 mm per side, with a density of about 2.0 g/cm³ and a black colour.

The briquette had the post-calcination composition shown in Table 10:

TABLE 10

| C | 28.7% |
|---|---|
| Fe | 0.5% |
| CaO | 3.5% |
| MgO | 35.3% |
| $Al_2O_3$ | 0.5% |
| $SiO_2$ | 1.7% |
| N | 0.1% |
| L.O.I. | 29.7% |

The briquette had a L.O.I. value of 29.7%, which is mainly attributed to the decomposition of the magnesium carbonate and the binder.

The density of the briquette, namely 2.0 g/cm³, is greater than that of loose powdered metallurgical coke, which has a density of about 0.5 g/cm³. As will be appreciated, the higher density of the briquette has the effect of increasing the efficiency of the carbon addition, since the carbon is allowed to penetrate the bath, rather than simply floating on top of the bath.

Example 5

In this example, a briquette having the composition shown in Table 11 was made:

TABLE 11

| Metallurgical coke | 14.0% |
|---|---|
| $MgCO_3$ | 76.0% |
| Molasses | 6.0% |
| Lime (hyd.) | 4.0% |

The briquette was formed by providing a mixture of powdered metallurgical coke (particle size range of about 0.8 to about 1.0 mm) and powdered magnesium carbonate ore (particle size range of about 0.8 to about 4.8 mm), together with a binder consisting of a mixture of industrial molasses and powdered hydrated lime.

The briquette had a generally square shape and a size of about 54 mm per side, with a density of about 2.0 g/cm$^3$ and a black colour.

The briquette had the post-calcination composition shown in Table 12:

TABLE 12

| | |
|---|---|
| C | 14.1% |
| FeO | 0.2% |
| CaO | 3.4% |
| MgO | 38.7% |
| $Al_2O_3$ | 0.1% |
| $SiO_2$ | 0.6% |
| N | 0.1% |
| L.O.I. | 42.8% |

The briquette had a L.O.I. value of 42.8%, which is mainly attributed to the decomposition of the magnesium carbonate and the binder.

The density of the briquette, namely 2.0 g/cm$^3$, is greater than that of loose powdered metallurgical coke, which has a density of about 0.5 g/cm$^3$. As will be appreciated, the higher density of the briquette has the effect of increasing the efficiency of the carbon addition, since the carbon is allowed to penetrate the bath, rather than simply floating on top of the bath.

Although embodiments have been described above, those of skill in the art will appreciate that variations and modifications may be made without departing from the scope thereof as defined by the appended claims.

What is claimed is:

1. A composite briquette for addition to a charge in a steelmaking or ironmaking furnace, the briquette comprising:
   about 75% by weight of magnesium carbonate;
   about 15% by weight metallurgical coke; and
   about 10% by weight of a binder.

2. The briquette of claim 1, wherein the magnesium carbonate is powdered magnesium carbonate ore, and wherein the briquette, after calcining, further comprises one or more substances selected from the group consisting of: CaO, $Al_2O_3$, $SiO_2$, and $Fe_2O_3$.

3. The briquette of claim 1, wherein the binder comprises molasses and hydrated lime.

4. The briquette of claim 1, wherein the binder comprises dextrin combined with water.

5. The briquette of claim 1, wherein the furnace is an electric arc furnace, a basic oxygen furnace, or a blast furnace.

6. A composite briquette for addition to the charge in a steelmaking or ironmaking furnace, the briquette comprising:
   about 52% by weight magnesium carbonate;
   about 30% by weight metallurgical coke;
   about 9% by weight magnesium oxide; and
   about 9% by weight of the binder.

7. The briquette of claim 6, wherein the magnesium carbonate is powdered magnesium carbonate ore, and wherein the briquette, after calcining, further comprises one or more substances selected from the group consisting of: CaO, $Al_2O_3$, $SiO_2$, and $Fe_2O_3$.

8. The briquette of claim 6, wherein the binder comprises molasses and hydrated lime, or wherein the binder comprises dextrin combined with water.

9. The briquette of claim 6, wherein the furnace is an electric arc furnace, a basic oxygen furnace, or a blast furnace.

10. A method of improving the charge in a steelmaking or ironmaking furnace, the charge having a slag layer on top of the charge, the method comprising the steps of:
    adding a composite briquette to the charge below the slag layer, the composite briquette comprising:
    about 75% by weight magnesium carbonate,
    about 15% by weight metallurgical coke, and
    about 10% by weight of the binder, the steelmaking or ironmaking furnace being an electric arc furnace, a basic oxygen furnace, or a blast furnace.

11. A composite briquette for addition to the charge in a steelmaking or ironmaking furnace, the briquette comprising:
    about 75% by weight of magnesium carbonate;
    about 15% by weight of one or more carbonaceous substances selected from the group consisting of: metallurgical coke, carbon fines, anthracite, and non-anthracitic coal; and
    about 10% by weight of a binder.

12. The briquette of claim 11, wherein the magnesium carbonate is powdered magnesium carbonate ore, and wherein the briquette, after calcining, further comprises one or more substances selected from the group consisting of: CaO, $Al_2O_3$, $SiO_2$, and $Fe_2O_3$.

13. The briquette of claim 11, wherein the binder comprises molasses and hydrated lime, or wherein the binder comprises dextrin combined with water.

14. The briquette of claim 11, wherein the furnace is an electric arc furnace, a basic oxygen furnace, or a blast furnace.

* * * * *